US012460897B2

(12) United States Patent
McPherson et al.

(10) Patent No.: US 12,460,897 B2
(45) Date of Patent: Nov. 4, 2025

(54) ARCHERY BOW WITH CONDITIONAL DATA ANALYSIS

(71) Applicant: MCP IP, LLC, Sparta, WI (US)

(72) Inventors: Mathew A. McPherson, Norwalk, WI (US); Mark J. Hayes, Onalaska, WI (US); Jon B. Simonds, Gainesville, FL (US); Jeffrey A. Ozanne, La Crosse, WI (US)

(73) Assignee: MCP IP, LLC, Sparta, WI (US)

( * ) Notice: Subject to any disclaimer, the term of this patent is extended or adjusted under 35 U.S.C. 154(b) by 76 days.

(21) Appl. No.: 17/844,608

(22) Filed: Jun. 20, 2022

(65) Prior Publication Data

US 2023/0019704 A1 Jan. 19, 2023

Related U.S. Application Data

(60) Provisional application No. 63/212,520, filed on Jun. 18, 2021.

(51) Int. Cl.

*F41B 5/14* (2006.01)
*F41B 5/10* (2006.01)
*G01P 15/14* (2013.01)
*G01P 15/18* (2013.01)

(52) U.S. Cl.

CPC .............. *F41B 5/1484* (2013.01); *F41B 5/10* (2013.01); *G01P 15/14* (2013.01); *G01P 15/18* (2013.01)

(58) Field of Classification Search

CPC ...... F41B 5/00; F41B 5/10; F41B 5/14; F41B 5/1403; F41B 5/1476; F41B 5/148; F41B 5/1484; G01P 15/14

USPC ........................ 124/23.1, 25.6, 32, 86, 88, 1

See application file for complete search history.

(56) References Cited

U.S. PATENT DOCUMENTS

| | | | | |
|---|---|---|---|---|
| 5,934,267 | A * | 8/1999 | Briner | F41B 5/14 124/88 |
| 6,029,120 | A * | 2/2000 | Dilger | F41B 5/14 324/179 |
| 6,257,220 | B1 | 7/2001 | McPherson et al. | |
| 6,382,201 | B1 | 5/2002 | McPherson et al. | |
| 7,119,304 | B2 * | 10/2006 | Meyers | A63C 11/222 219/535 |
| 7,165,543 | B2 * | 1/2007 | Simo | F41B 5/143 124/44.5 |
| 7,318,429 | B2 * | 1/2008 | Achkar | F41B 5/14 124/88 |
| 7,337,773 | B2 * | 3/2008 | Simo | F41B 5/143 124/44.5 |
| RE42,842 | E | 10/2011 | McPherson | |
| 8,038,133 | B2 | 10/2011 | McPherson | |
| 8,186,339 | B1 * | 5/2012 | McClanahan | F41B 5/1484 446/404 |
| 8,286,871 | B2 | 10/2012 | Bay | |

(Continued)

*Primary Examiner* — Alexander R Niconovich

(74) *Attorney, Agent, or Firm* — Laabs Intellectual Property

(57) ABSTRACT

In some embodiments, an archery bow comprises a riser comprising a cavity and a grip attached to the riser and arranged to cover the cavity. A first limb is supported by the riser and a second limb is supported by the riser. A bowstring extends between the first limb and the second limb. A data device comprises an accelerometer. In some embodiments, the data device is oriented in the cavity and attached to the riser.

20 Claims, 6 Drawing Sheets

(56) References Cited

U.S. PATENT DOCUMENTS

| | | | | |
|---|---|---|---|---|
| 8,316,551 | B2 * | 11/2012 | Gorsuch | F41G 1/467 124/87 |
| 8,387,608 | B2 * | 3/2013 | Morris, II | F41B 5/1403 124/25.6 |
| 8,408,195 | B2 | 4/2013 | McPherson | |
| 8,500,563 | B2 | 8/2013 | Roman et al. | |
| 8,529,383 | B2 | 9/2013 | Donahoe | |
| 8,899,220 | B2 * | 12/2014 | Morris, II | F41B 5/10 124/23.1 |
| 9,046,317 | B2 * | 6/2015 | McPherson | F41B 5/1426 |
| 9,335,120 | B2 | 5/2016 | Roman et al. | |
| 9,429,393 | B2 * | 8/2016 | Graziano | F41B 5/10 |
| 9,523,556 | B2 * | 12/2016 | Grace, Jr. | F41G 1/467 |
| 9,605,923 | B2 | 3/2017 | McPherson | |
| 9,970,730 | B2 * | 5/2018 | Thacker, Jr. | F41B 5/1434 |
| 10,281,229 | B2 * | 5/2019 | Haynes | G01L 5/047 |
| 10,393,471 | B2 | 8/2019 | McPherson et al. | |
| 10,401,118 | B2 * | 9/2019 | Donahoe | F41B 5/1403 |
| 10,612,885 | B2 * | 4/2020 | Conger | G06F 3/017 |
| 10,871,356 | B2 | 12/2020 | Ferguson | |
| 11,105,593 | B2 | 8/2021 | Ozanne | |
| 11,306,993 | B2 * | 4/2022 | Bushman | G01P 3/685 |
| 2007/0151552 | A1 * | 7/2007 | Czemske | F41B 5/10 124/25.6 |
| 2009/0293855 | A1 * | 12/2009 | Danielson | F41G 1/35 124/87 |
| 2011/0277738 | A1 * | 11/2011 | Morris, II | F41B 5/10 124/1 |
| 2014/0338440 | A1 * | 11/2014 | Donahoe | F42B 12/365 73/167 |
| 2016/0076849 | A1 * | 3/2016 | Gold | F41B 5/1403 124/88 |
| 2016/0138885 | A1 * | 5/2016 | White | F41B 5/14 124/87 |
| 2018/0058961 | A1 * | 3/2018 | Dunham | F41B 5/148 |
| 2018/0216913 | A1 * | 8/2018 | Schwartz | F41B 5/1411 |
| 2019/0285492 | A1 | 9/2019 | Dunham et al. | |
| 2020/0062970 | A1 | 2/2020 | McPherson | |
| 2020/0116453 | A1 * | 4/2020 | Pell | A63F 13/92 |
| 2020/0263956 | A1 | 8/2020 | Allgaier | |
| 2021/0341252 | A1 | 11/2021 | McPherson | |
| 2022/0196363 | A1 * | 6/2022 | Allgaier | F41B 5/1476 |
| 2022/0260333 | A1 * | 8/2022 | Vaquer | F41B 5/1426 |

* cited by examiner

ARCHERY BOW WITH CONDITIONAL DATA ANALYSIS

CROSS-REFERENCE TO RELATED APPLICATIONS

This application claims the benefit of U.S. Patent Application No. 63/212,520, filed Jun. 18, 2021, the entire content of which is hereby incorporated herein by reference.

BACKGROUND OF THE INVENTION

This invention relates generally to archery bows and more particularly to archery bows capable of measuring, capturing and/or analyzing data relevant to the shooting process.

Archery bows are generally known in the art and used to launch arrows. An arrow's actual flight path often differs from the intended flight path. Many different factors can impact a shooter's accuracy. Some errors can be considered user-dependent or user-induced, such as torquing the bow during aiming and firing (e.g. user-induced yaw). Archers tend to shoot more accurately when the shooting conditions, such as bow orientation, loading, etc., are identical shot after shot. Small changes in bow orientation can result in different arrow flight paths under conditions that seem similar to the shooter.

There remains a need for archery bows capable of capturing conditional data during the bow drawing and shooting processes. There remains a need for archery bows capable of analyzing conditional data and providing feedback to a shooter.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

BRIEF SUMMARY OF THE INVENTION

In some embodiments, an archery bow comprises a riser, a first limb supported by the riser and a second limb supported by the riser. A bowstring extends between the first limb and the second limb. A data device is attached to the riser. The data device comprises an accelerometer.

In some embodiments, the riser comprises a cavity and the data device is oriented in the cavity. In some embodiments, the riser comprises a grip and the grip is positioned over the cavity. In some embodiments, the grip comprises a window. In some embodiments, the data device is visible through the window. In some embodiments, the data device comprises a display and the display is visible through the window. In some embodiments, the data device comprises a button and the button is oriented in the window.

In some embodiments, the riser cavity comprises a sidewall and the data device comprises a housing in contact with the sidewall.

In some embodiments, the data device is arranged to measure and record conditional data.

In some embodiments, the bow comprises a grip, the data device is attached to the grip and the grip is attached to the riser.

In some embodiments, the grip comprises a flange contacting the data device, the riser comprises a cavity and the flange extends into the cavity.

In some embodiments, the bow comprises a cable guard attached to the riser and a string stop attached to the riser, and the data device is positioned between the cable guard and the string stop.

In some embodiments, the data device comprises a first data device and the bow further comprises a second data device attached to the riser. In some embodiments, the riser comprises a first cavity and a second cavity. The first data device is oriented in the first cavity and the second data device is oriented in the second cavity.

In some embodiments, a feedback indicator is attached to the riser and the feedback indicator is in electronic communication with the data device.

In some embodiments, an archery bow comprises a riser comprising a cavity and a grip attached to the riser and arranged to cover the cavity. A first limb is supported by the riser and a second limb is supported by the riser. A bowstring extends between the first limb and the second limb. A data device comprises an accelerometer. The data device is oriented in the cavity and attached to the riser.

In some embodiments, the data device comprises a gyroscope.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
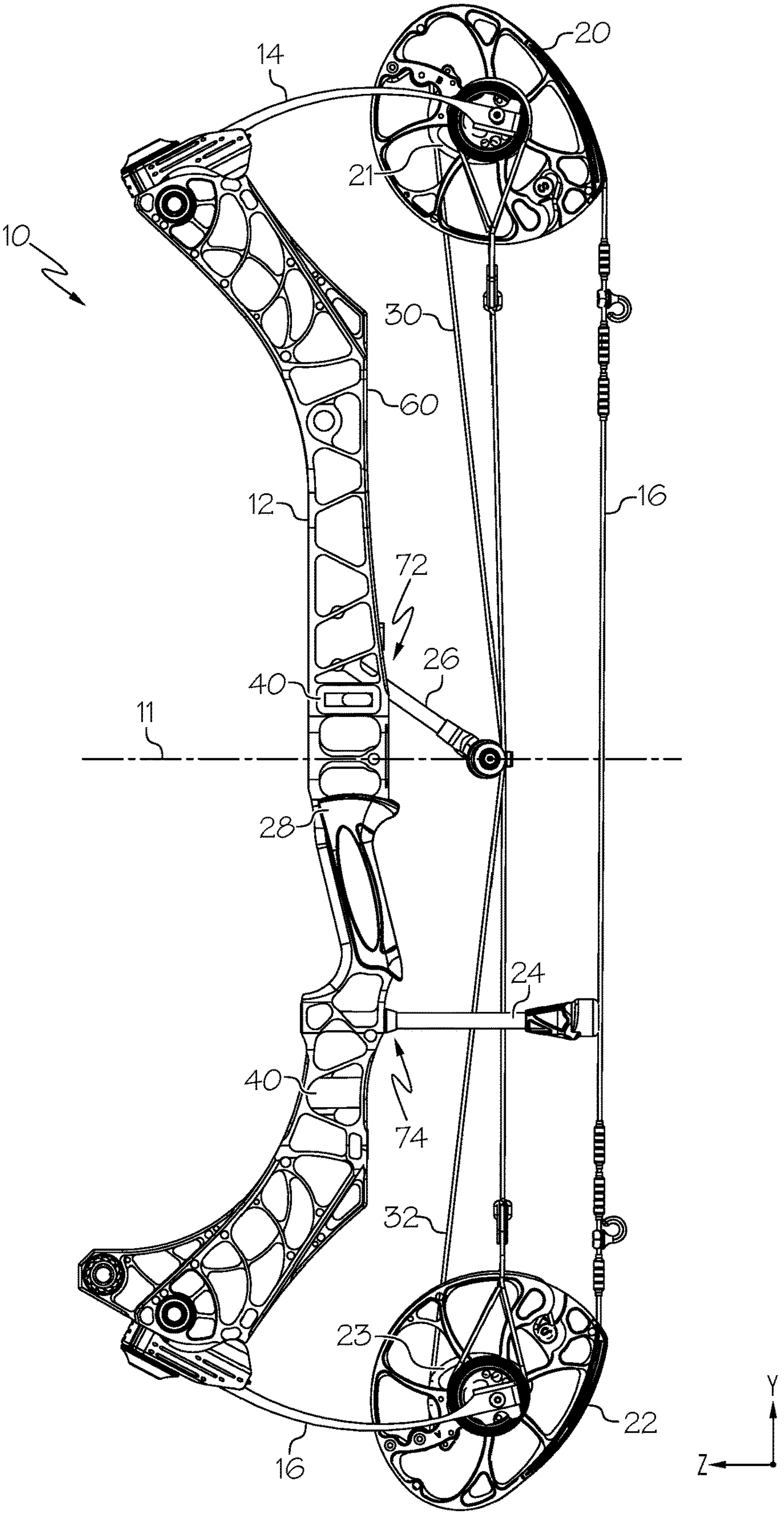
FIG. 1 shows an embodiment of an archery bow in a brace condition.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

FIG. 1 shows an embodiment of an archery bow 10 in a brace or undrawn condition. In some embodiments, a bow 10 comprises a riser 12, a first limb 14 and a second limb 18. Desirably, a bowstring 16 extends between the limbs 14, 18 and is arranged to flex the limbs 14, 18 as the bowstring 16 is drawn. In some embodiments, a bow 10 comprises a recurve bow or other non-compound type of bow (not illustrated). In some embodiments, for example as shown in FIG. 1, an archery bow 10 comprises a compound bow. In some embodiments, a bow 10 comprises a first rotatable member 20 supported by the first limb 14 and a second rotatable member 22 supported by the second limb 18. In some embodiments, the bow 10 comprises a first power cable 30. In some embodiments, the first rotatable member 20 comprises a first cam 21 arranged to take up the first power cable 30 as the bowstring 16 is drawn. In some embodiments, the bow 10 comprises a second power cable 32. In some embodiments, the second rotatable member 22 comprises a second cam 23 arranged to take up the second power cable 32 as the bowstring 16 is drawn.

In some embodiments, a bow 10 comprises a cable guard 26 arranged to bias a first cable 30 away from a shooting axis 11, for example in a lateral direction. In some embodiments, the cable guard 26 is arranged to bias a second cable 32 away from the shooting axis 11. In some embodiments, a cable guard 26 is attached to the riser 12 at a cable guard attachment location 72.

In some embodiments, a bow 10 comprises a string stop 24 arranged to contact the bowstring 16. In some embodiments, a string stop 24 is arranged to reduce movement of the bowstring 16 after an arrow is launched.

Figure 2:
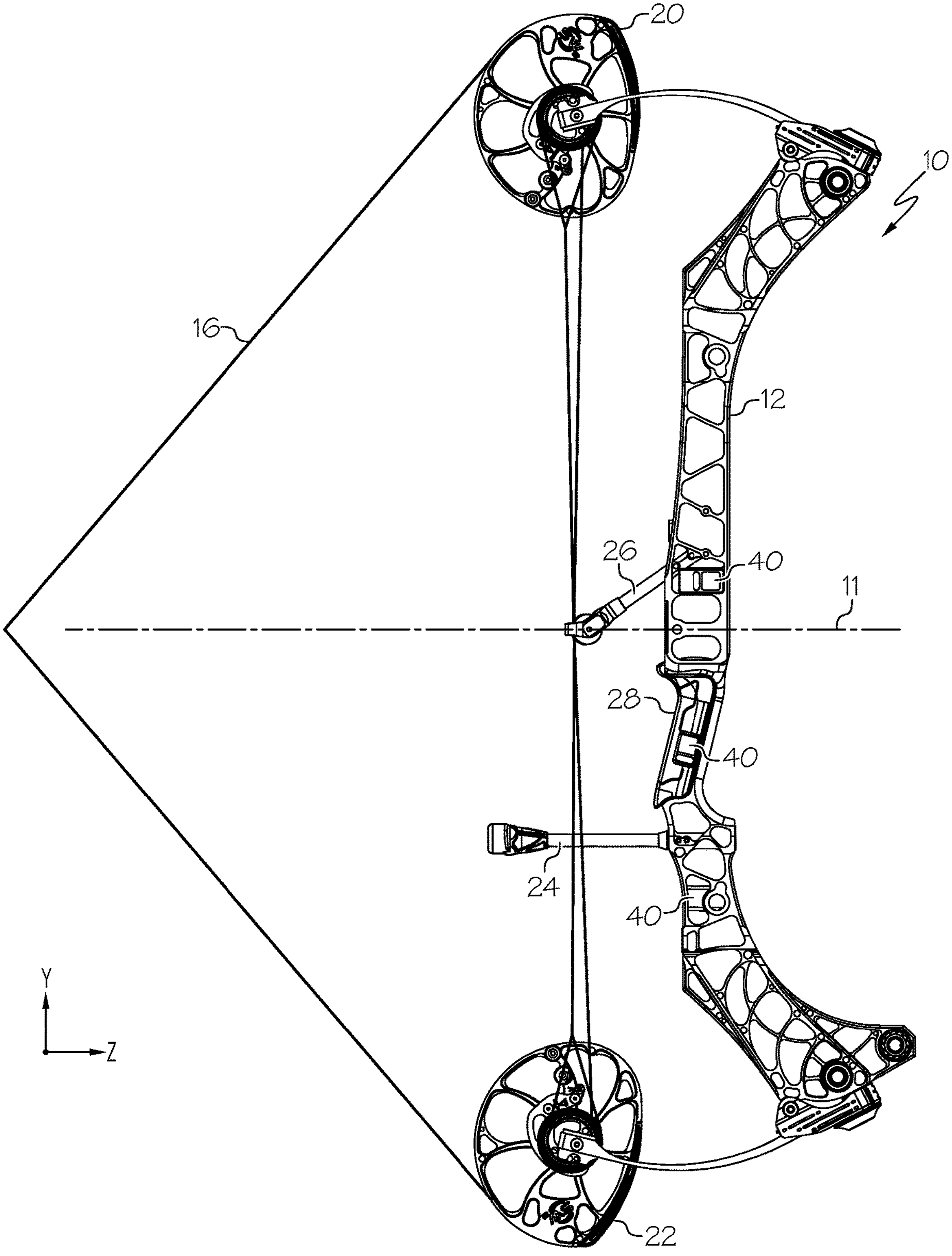
FIG. 2 shows an embodiment of an archery bow in a drawn condition.

FIG. 2 shows an embodiment of a bow 10 in a drawn condition. A user will generally draw the bow 10 by pulling the bowstring 16, which flexes the limbs 14, 18 and stores energy. In some embodiments, a bow 10 can reach a fully drawn condition, for example wherein a draw stop prevents further draw of the bowstring 16. When the bowstring 16 is released, the bow 10 can launch an arrow, for example along the shooting axis 11. As the bow 10 is used, it experiences various movements, forces, vibrations and loading conditions.

Figure 4:
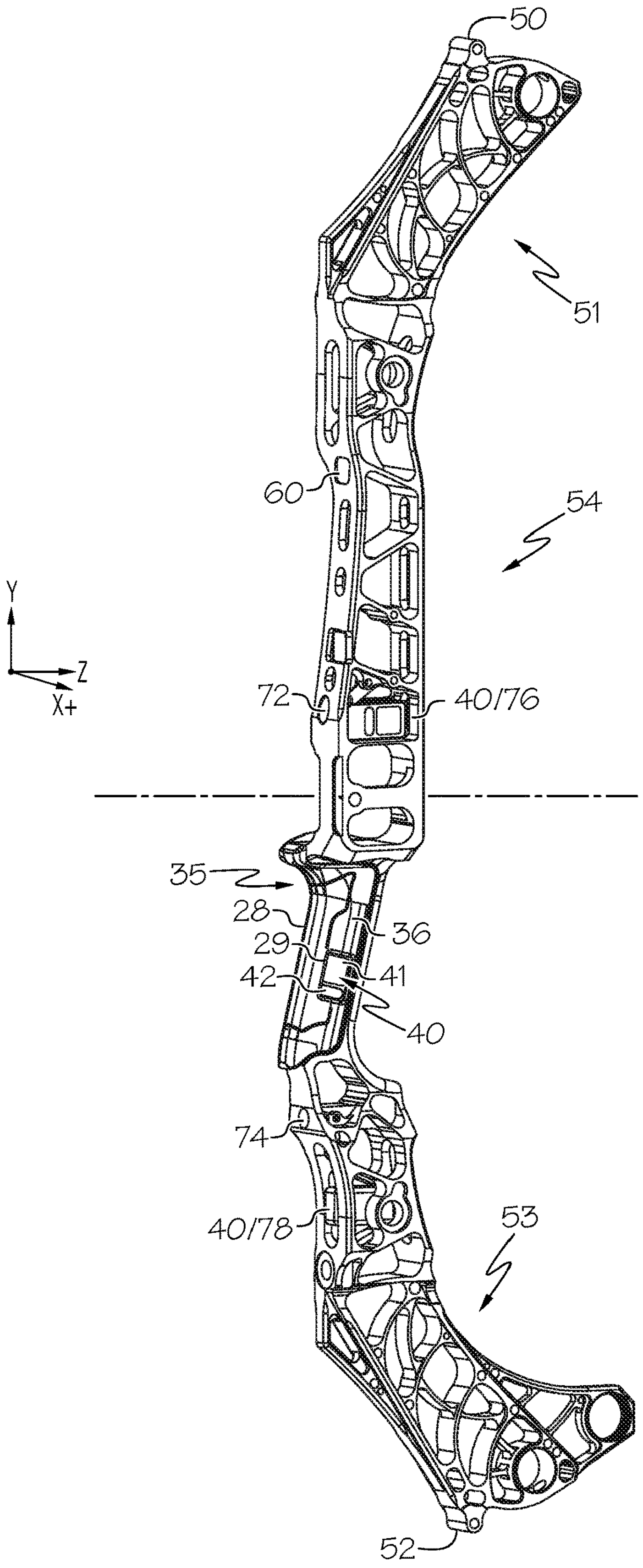
FIG. 4 shows an embodiment of an archery bow riser.

In some embodiments, a reference coordinate system comprising three orthogonal axes is defined in 3-dimensional space (see e.g. FIGS. 1, 2 and 4). In some embodiments, a z-axis extends in front of and behind the bow 10. In some embodiments, a shooting axis 11 can be aligned upon the z-axis or parallel to the z-axis. In some embodiments, rotation of the bow 10 about the z-axis comprises a roll movement. In some embodiments, a y-axis extends in a vertical direction. In some embodiments, the y-axis extends parallel to a gravity vector. In some embodiments, rotation of the bow 10 about the y-axis comprises a yaw movement. In some embodiments, a yaw movement is referred to as "torquing" the bow. In some embodiments, an x-axis extends in lateral directions with respect to the bow 10. In some embodiments, rotation of the bow 10 about the x-axis comprises a pitch movement.

In some embodiments, the bow 10 comprises a data device 40 arranged to measure data relevant to a condition of the bow 10. In some embodiments, a data device 40 is arranged to capture and store data. In some embodiments, a data device 40 is arranged to analyze data. In some embodiments, a data device 40 is arranged to output information, such as measured data and/or analyzed data. In some embodiments, a data device 40 is arranged to accept instructions and/or other user input.

In some embodiments, a data device 40 is in mechanical communication with the riser 12. In some embodiments, the data device 40 contacts the riser 12. In some embodiments, the data device 40 is attached to the riser 12 using an adhesive, a fastener, a friction fit or any other suitable method of attachment or combination of methods for attachment.

Figure 3:
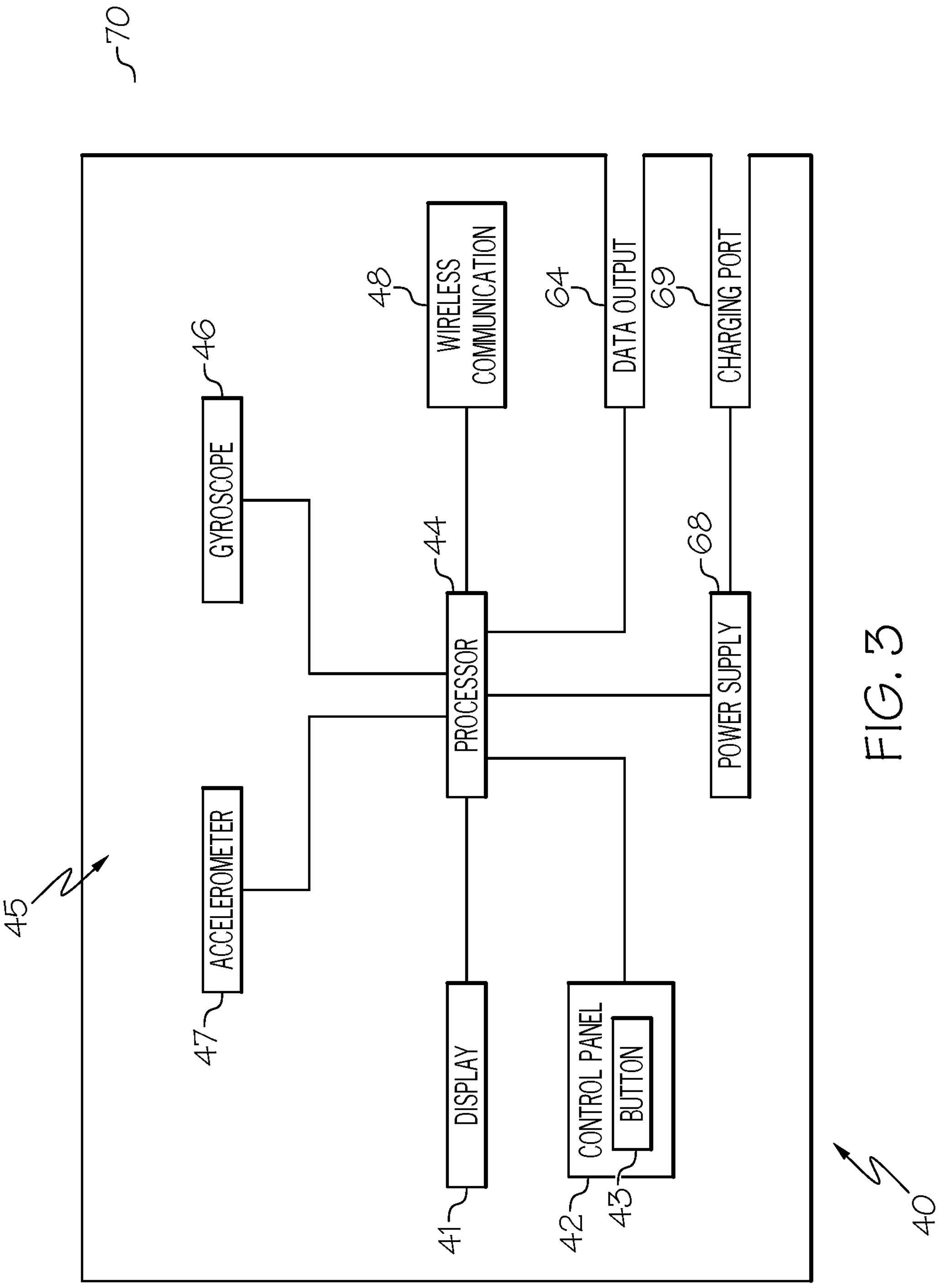
FIG. 3 shows a schematic diagram of an embodiment of a data sensing and capturing device.

FIG. 3 shows a schematic diagram of an embodiment of a data device 40. In some embodiments, a data device 40 comprises a sensor 45. In some embodiments, a data device 40 comprises a plurality of sensors 45. In some embodiments, a sensor 45 is arranged to detect a condition of the bow 10 and output a signal, for example to a processor 44. In some embodiments, a sensor 45 comprises an accelerometer 47. In some embodiments, a data device 40 comprises a plurality of accelerometers 47, such as an accelerometer arranged to detect acceleration along each of the three axes of rotation. In some embodiments, an accelerometer 47 comprises a 3-axis accelerometer. In some embodiments, a sensor 45 comprises a gyroscope 46.

In some embodiments, a data device 40 comprises a processor 44. In some embodiments, the processor 44 is arranged to receive information from each of the sensors 45 of the data device 40, such as an accelerometer and a gyroscope.

In some embodiments, a data device 40 comprises an onboard interface 42 such as a control panel. In some embodiments, an onboard interface 42 comprises an input device 43 such as a button or switch.

In some embodiments, a data device 40 comprises a power supply 68. In some embodiments, a data device 40 comprises a charging port 69. In some embodiments, a data device 40 is arranged for wireless charging, for example comprising an inductive coil in electrical communication with the power supply 68.

In some embodiments, a data device 40 is arranged for wireless communication 48 using any suitable method. In some embodiments, a data device 40 comprises an antenna.

In some embodiments, a data device 40 comprises a data output 64 arranged to provide a signal to another piece of equipment. In some embodiments, a data output 64 comprises a display output, for example a wire or plurality of wires (e.g. ribbon cable) in communication with a remote display.

In some embodiments, the data device 40 comprises a USB port or any other known type of terminal. In some embodiments, a charging port 69 and/or a data port 64 comprises a USB port.

In some embodiments, a data device 40 comprises a housing 70 and the components of the data device 40 are contained within the housing 70.

FIG. 4 shows an embodiment of a riser 12. In some embodiments, a riser 12 comprises a first end 50 and a second end 52. In some embodiments, a shooting axis 11 is located midway between the first end 50 and the second end 52. In some embodiments, a length of the riser 12 is measured in a direction orthogonal to the shooting axis 11. In some embodiments, the riser 12 comprises a first end segment 51, a central segment 54 and a second end segment 53.

In some embodiments, a data device 40 is located in the central segment 54 of the riser 12. In some embodiments, the grip 28 is located in the central segment 54. In some embodiments, the shooting axis 11 is located in the central segment 54.

In some embodiments, the central segment 54 comprises one-third of the length of the riser 12, the first end segment 51 comprises one-third of the length of the riser 12 and the second end segment 53 comprises one-third of the length of the riser 12. In some embodiments, the central segment 54 comprises one-half of the length of the riser 12, the first end segment 51 comprises one-quarter of the length of the riser 12 and the second end segment 53 comprises one-quarter of the length of the riser 12.

In some embodiments, the riser 12 comprises a cable guard attachment location 72 and a string stop attachment location 74. In some embodiments, a data device 40 is supported by the riser 12 at a location between the cable guard attachment location 72 and the string stop attachment location 74.

In some embodiments, the riser 12 comprises a first material and a grip 28 comprises a second material different from the first material. In some embodiments, the riser 12 comprises a metal. In some embodiments, the riser 12 comprises a single piece of material. In some embodiments, the riser 12 comprises a composite comprising reinforcing material and filler material, such as fiberglass, carbon fiber and the like. In some embodiments, a grip 28 comprises a polymeric material. In some embodiments, a grip 28 is attached to the riser 12, for example using an adhesive or a fastener. In some embodiments, a material of the grip 28 comprises a higher modulus of elasticity than a material of the riser 12.

In some embodiments, a data device 40 is oriented beneath the grip 28. In some embodiments, the grip 28 comprises a window 29. In some embodiments, the data device 40 is visible through the window 29. In some embodiments, an onboard display 41 is visible through the window 29. In some embodiments, an interface 42 is accessible and manipulatable through the window 29.

In some embodiments, a grip 28 comprises a first side 35 and a second side 36. In some embodiments, the first side 35 comprises a palm side arranged to contact the upper palm of a shooter's hand. In some embodiments, the second side 36 comprises a finger side arranged to contact at least one finger of a shooter's hand. For example, in some embodiments, a shooter's finger can wrap around the riser 12 and a tip of the finger can contact the finger side 36 of the grip 28. In some embodiments, the window 29 is in the finger side 36 of the grip 28. In some embodiments, a shooter can grasp the grip 28 with a given hand and manipulate the interface 42 with a finger of the same hand.

In some embodiments, a riser 12 comprises a feedback indicator 60. In some embodiments, a feedback indicator 60 is spaced apart from the data device 40. In some embodiments, a feedback indicator 60 comprises a light. In some embodiments, a feedback indicator 60 comprises an optical display 62, such as an lcd screen. In some embodiments, a data device 40 comprises an output arranged to control the feedback indicator 60. In some embodiments, a feedback indicator 60 is arranged to illuminate when the data device 40 determines that the bow 10 is level.

In some embodiments, a riser 12 comprises a second data device 76. In some embodiments, a riser 12 comprises a third data device 78.

Figure 5:
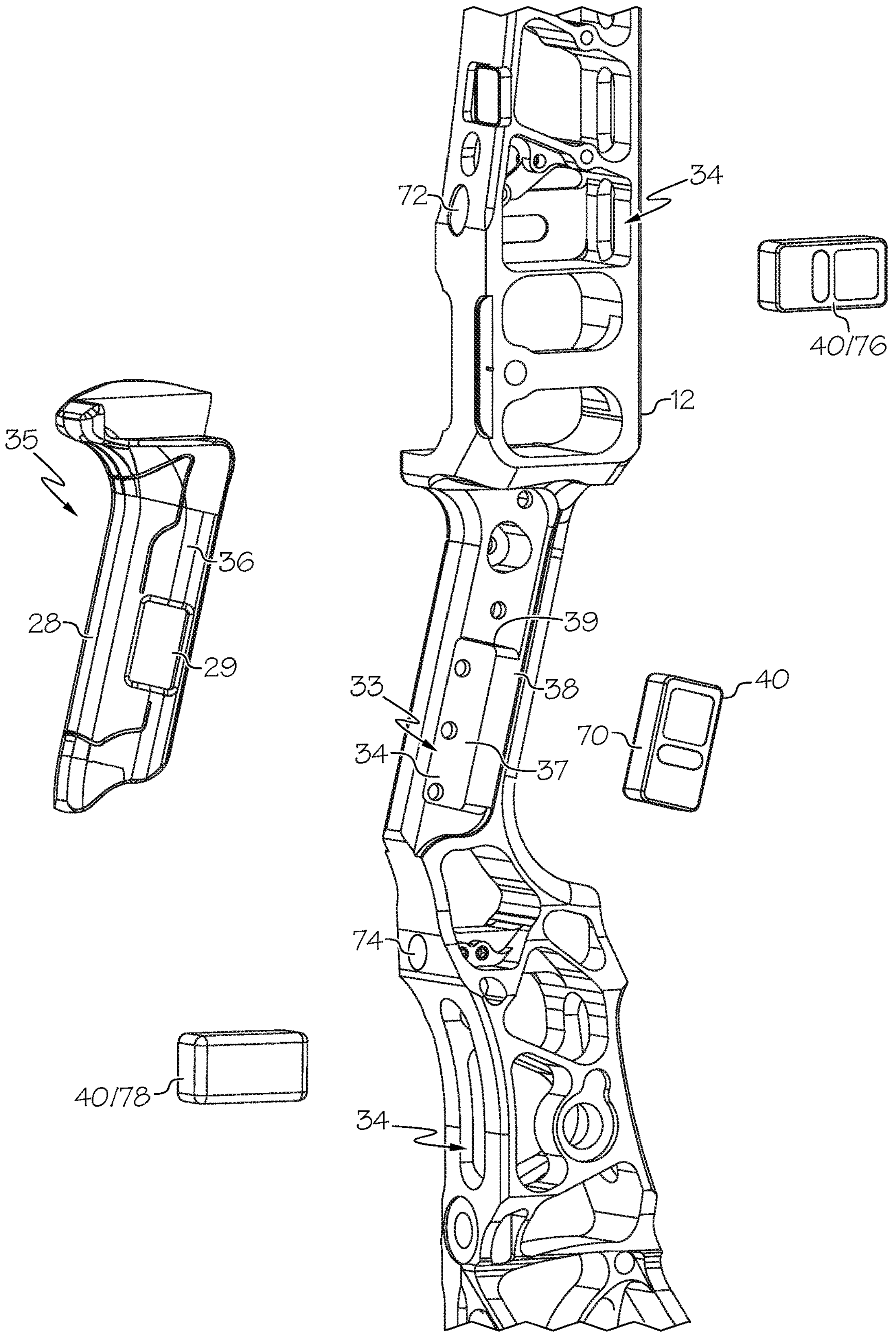
FIG. 5 shows an exploded view of the riser shown in FIG. 4.

FIG. 5 shows an exploded view of some components shown in FIG. 4. In some embodiments, the riser 12 comprises a cavity 34 arranged to receive a data device 40. In some embodiments, a riser 12 comprises a plurality of cavities 34 capable of receiving a data device 40.

In some embodiments, a cavity 34 is oriented beneath the grip 28. In some embodiments, at least a portion of the grip 28 is arranged to cover the cavity 34. In some embodiments, a window 29 of the grip 28 is positionable over the cavity 34. In some embodiments, a cavity 34 comprises a sidewall 38. In some embodiments, a data device 40 is arranged to contact the sidewall 38. In some embodiments, a cavity 34 comprises a first sidewall 38 and a second sidewall 39 oriented at an angle to the first sidewall 38. In some embodiments, a data device 40 is arranged to contact multiple sidewalls 38, 39. In some embodiments, the cavity 34 comprises a backwall 37. In some embodiments, a data device 40 is arranged to contact the backwall 37. In some embodiments, the backwall 37 is oriented adjacent to or contacting the palm side 35 of the grip 28. In some embodiments, the riser 12 defines an aperture 33 into the cavity 34. In some embodiments, a data device 40 can be installed in the cavity 34 by inserting the data device 40 through the aperture 33. In some embodiments, the aperture 33 is oriented adjacent to the finger side 36 of the grip 28.

In some embodiments, a cavity 34 is located between a cable guard attachment location 72 and a string stop attachment location 74.

Figure 6:
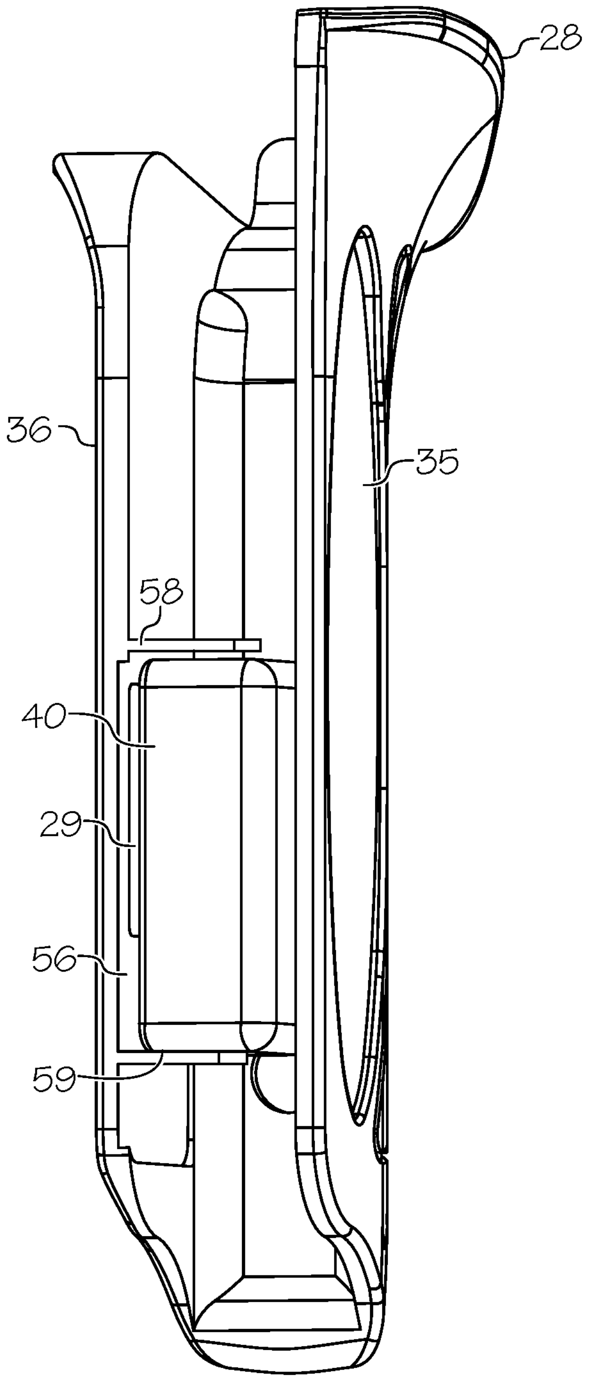
FIG. 6 shows an embodiment of a grip.

FIG. 6 shows an embodiment of a grip 28 comprising a data device 40. In some embodiments, a data device 40 is attached to the grip 28 and the grip 28 can be attached to a riser 12. In some embodiments, the grip 28 comprises a cavity 56 arranged to contain the data device 40. In some embodiments, a window 29 comprises an aperture into the cavity 56. In some embodiments, the grip 28 comprises a flange 58 that partially defines the cavity 56. In some embodiments, the flange 58 contacts the data sensor 40. In some embodiments, the grip 28 comprises a second flange 59 that partially defines the cavity 56. In some embodiments, the second flange 59 contacts the data sensor 40.

Referring to FIGS. 5 and 6, in some embodiments, the flange 58 of a grip 28 is arranged to extend into a cavity 34 formed in a riser 12. In some embodiments, the flange 58 is arranged to contact a wall portion of the cavity 34, such as a sidewall 38, 39 and/or a backwall 37. In some embodiments, the second flange 59 of a grip 28 is arranged to extend into the cavity 34. In some embodiments, the second flange 59 is arranged to contact the riser 12.

In some embodiments, a grip 28 comprises one or more button covers, for example molded into a body of the grip 28. In some embodiments, each button cover is positioned over a button of the data device 40.

In some embodiments, a bow 10 comprises features as described in U.S. Patent Application No. 63/211,331, filed Jun. 16, 2021, entitled Smart Archery Bow with Performance Monitoring and Learning Features, the entire content of which is hereby incorporated herein by reference. In some embodiments, a bow 10 comprises features as described in U.S. patent application Ser. No. 17/836,486, filed Jun. 9, 2022, the entire content of which is hereby incorporated herein by reference.

U.S. patent application Ser. No. 17/246,166, filed Apr. 30, 2021, describes embodiments of archery bows and is hereby incorporated herein by reference in its entirety. U.S. Pat. No. 10,393,471, issued Aug. 27, 2019, describes embodiments of archery bows and is hereby incorporated herein by reference in its entirety.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. An archery bow comprising:

a riser comprising a first cavity and a second cavity;

a first limb supported by the riser;

a second limb supported by the riser;

a bowstring extending between the first limb and the second limb; and a first data device attached to the riser and oriented in the first cavity, the first data device comprising an accelerometer and a processor; and a second data device attached to the riser and oriented in the second cavity, the second data device comprising an accelerometer and a processor;

the first data device comprising a first orientation, the second data device comprising a second orientation different from the first orientation.

2. The archery bow of claim 1, the riser comprising a grip, the grip positioned over the first cavity.

3. The archery bow of claim 2, the grip comprising a window.

4. The archery bow of claim 3, the first data device visible through the window.

5. The archery bow of claim 4, the first data device comprising a display, the display visible through the window.

6. The archery bow of claim 5, the first data device comprising a button, the button oriented in the window.

7. The archery bow of claim 1, the first cavity comprising a sidewall, the first data device comprising a housing in contact with the sidewall.

8. The archery bow of claim 1, the first data device arranged to measure and record conditional data.

9. The archery bow of claim 1, comprising a grip, the first data device attached to the grip, the grip attached to the riser.

10. The archery bow of claim 9, the grip comprising a flange contacting the first data device, the riser comprising a cavity, the flange oriented in the cavity.

11. The archery bow of claim 1, comprising a cable guard attached to the riser and a string stop attached to the riser, the first data device positioned between the cable guard and the string stop.

12. The archery bow of claim 1, comprising a feedback indicator attached to the riser, the feedback indicator in electronic communication with the first data device.

13. The archery bow of claim 1, a longitudinal axis of the first data device oriented nonparallel to a longitudinal axis of the second data device.

14. An archery bow comprising:

a riser comprising a cavity;

a grip attached to the riser and arranged to cover the cavity, the grip comprising a flange, the flange oriented in the cavity;

a first limb supported by the riser;

a second limb supported by the riser;

a bowstring extending between the first limb and the second limb; and a data device comprising an accelerometer and a processor, the data device oriented in the cavity and contacting the flange.

15. The archery bow of claim 14, the grip comprising a window.

16. The archery bow of claim 15, the data device visible through the window.

17. The archery bow of claim 16, the data device comprising a display, the display visible through the window.

18. The archery bow of claim 14, the data device comprising a gyroscope.

19. The archery bow of claim 14, the data device comprising a first data device, the bow further comprising a second data device attached to the riser.

20. The archery bow of claim 19, a longitudinal axis of the first data device oriented nonparallel to a longitudinal axis of the second data device.

* * * * *